(No Model.)
B. T. TRUEBLOOD.
GEARING FOR WASHING MACHINES.
No. 268,753. Patented Dec. 5, 1882.
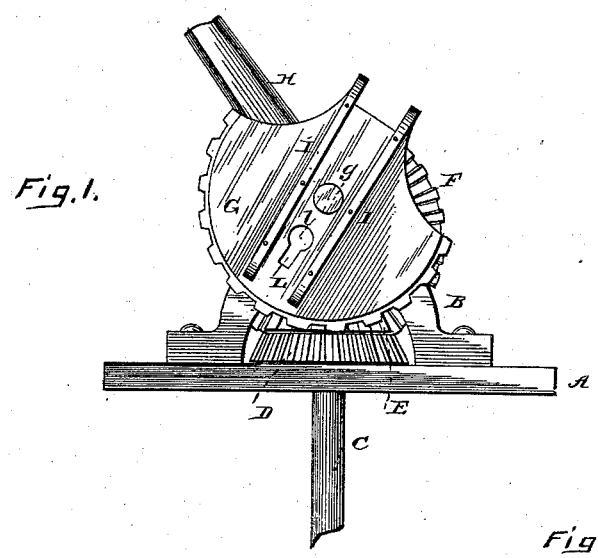
Fig. 1.
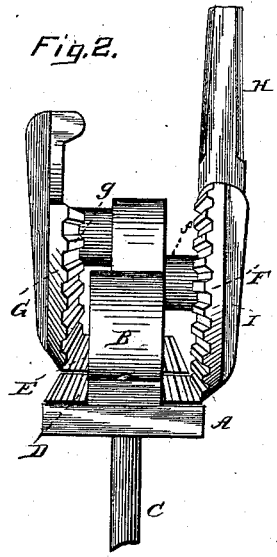
Fig. 2.
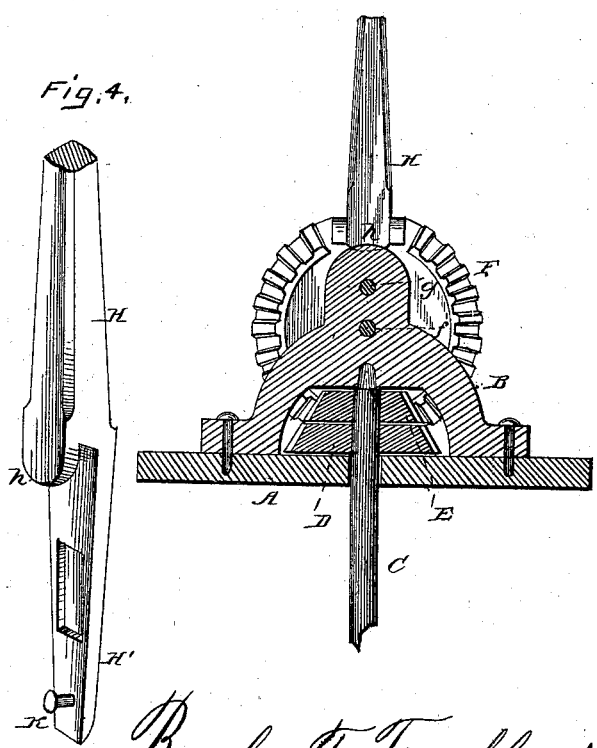
Fig. 3.
Fig. 4.
WITNESSES:
Fred. G. Dieterich
John G. Hinkel
Barclay T. Trueblood
INVENTOR.
by Louis Bagger & Co.
ATTORNEYS.

UNITED STATES PATENT OFFICE.

BARCLAY T. TRUEBLOOD, OF SALEM, IOWA.

GEARING FOR WASHING-MACHINES.

SPECIFICATION forming part of Letters Patent No. 268,753, dated December 5, 1882.

Application filed August 5, 1882. (No model.)

*To all whom it may concern:*

Be it known that I, BARCLAY T. TRUEBLOOD, of Salem, in the county of Henry and State of Iowa, have invented certain new and useful Improvements in Gearing for Washing-Machines; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of my improved gearing for washing-machines. Fig. 2 is a front elevation of the same. Fig. 3 is a sectional view through the center of the pinions and their bearings; and Fig. 4 is a perspective detail view of the removable crank or handle.

Similar letters of reference indicate corresponding parts in all the figures.

My invention has relation to the gearing for operating the beater or beaters of rotary reciprocating washing-machines; and it consists in the construction and arrangement of a duplex gearing, as hereinafter more fully described, and particularly pointed out in the claim.

In the accompanying drawings, A represents part of the top or cover of a washing-machine, upon which the bearing B is suitably secured. C is a rotary reciprocating beater-staff, which is suitably boxed in the cover A, and provided with a large beveled pinion, D, and a smaller beveled pinion, E, both of which are firmly keyed upon the staff—one above the other; or they may be cast in one piece. The large pinion, D, meshes with a beveled wheel, F, the short axle, *f*, of which is boxed in the bearing B on one side thereof, and the smaller pinion, E, meshes in like manner with the large beveled wheel or cogged segment, G, the shaft *g* of which is boxed in bearing B, opposite to the smaller cog-wheel, F.

Either one or both of the beveled wheels or segments F and G may be operated by the removable handle or lever H, the lower end, H', of which is wedge-shaped to permit it to fit between flanges I I upon the outer side or faces of beveled wheels F and G. It also has a lip, *h*, straddling the top part of the wheel, and at its lower end is the headed pin or bolt K, the head of which may be inserted through an enlargement, *l*, at the upper end of the slot L, made in the wheels F and G between their respective flanges I I. By this construction the lever or handle H may readily be changed from one of the wheels to the other, or from one side of the machine to the other, by simply pulling it in an upward direction, so as to permit the headed pin or bolt K to slip out of its fastening-slot L through the enlargement *l* of the same.

By changing lever H from one of the wheels to the other it will require greater or less power to run the machine, the lesser power being required for operating the smaller wheel, F, which meshes with the large pinion, D, while greater expenditure of power is required to operate large wheel, D, which meshes with the smaller pinion, E. In this manner the machine may be adjusted to suit persons of varying age or strength; or, if desired, and by affixing a handle to both of the wheels F and G, a person may operate both at the same time by alternately reciprocating them with the arms. It is obvious that in that event the throw of one of the levers H will be considerably greater than that of the other; but by changing the position from one side of the machine to the other the operator may shift his hands from one lever to the other if he should get tired out in one of the arms.

I am aware of Patents Nos. 190,804, of 1877, and 257,839, of 1882, and the constructions therein set forth are not sought to be covered in this application.

Having thus described my invention, I claim and desire to secure by Letters Patent of the United States—

In combination with the spindle C and gears D and E, keyed thereon, the large gear, F, meshing with the gear D, and having flanges I, shaft *f*, and eye-slot L, the gear G meshing with the gear E and having similar flanges, shaft, and slot, and the interchangeable handle H, having portion H', with stud K and lip *h*, all constructed, arranged, and operating as set forth.

In testimony that I claim the foregoing as my own I have hereunto affixed my signature in presence of two witnesses.

BARCLAY T. TRUEBLOOD.

Witnesses:
MATTHEW TRUEBLOOD,
DAVID M. TRUEBLOOD.